Oct. 24, 1944.   C. GERST   2,361,190
TRANSMISSION
Filed Oct. 30, 1942   4 Sheets-Sheet 1

INVENTOR.
CHRIS GERST
BY

Oct. 24, 1944.  C. GERST  2,361,190
TRANSMISSION
Filed Oct. 30, 1942  4 Sheets-Sheet 2

INVENTOR.
CHRIS GERST
BY

Oct. 24, 1944.   C. GERST   2,361,190
TRANSMISSION
Filed Oct. 30, 1942   4 Sheets-Sheet 4

INVENTOR.
CHRIS GERST
BY

Patented Oct. 24, 1944

2,361,190

UNITED STATES PATENT OFFICE 2,361,190

TRANSMISSION

Chris Gerst, Dearborn, Mich., assignor, by mesne assignments, to Transmission Specialties Company, Detroit, Mich., a partnership Application October 30, 1942, Serial No. 464,151

5 Claims. (Cl. 74—377)

This invention relates in general to transmissions and more particularly to reversible transmissions, such as marine transmissions, transmissions for mixers, etc., which generally include differential drive means co-operating with clutching means in effecting rotation of a driven shaft in one or the other direction, an arrangement which necessitates stopping and starting of the gearing of these transmissions during shifting operations and interferes with smooth running of their power sources.

The primary object of the present invention is the provision of an improved reversible transmission of simple, compact and rugged construction which embodies individual continuously rotating gearing for forward and reverse rotation of its driven shaft, which has its gearing axially aligned with said shaft and arranged in spaced relation with respect to each other, and which includes clutching means between the spaced gearing in axial alignment therewith, all for the purpose of insuring smooth running of the source of power driving the transmission and permitting of mounting of gearing and clutching means in individual compartments of a housing.

Another object of the invention is the provision of an improved reversible transmission which embodies individual continuously rotating gearing for forward and reverse rotation of its driven shaft, which has its gearing freely rotatably mounted on said shaft in spaced relation with respect to each other, and which includes clutching means shiftably mounted on said shaft between said gearing to permit of mounting of gearing and clutching means in individual compartments of a housing.

A further object of the invention is a transmission of the type referred to above which includes a housing, with individual chambers for the gearing and the clutch means to permit of the use of any desired type of clutching means in the transmission.

Still another object of this invention is a transmission of the type referred to above in which the gearing operates in heavy transmission oil, and in which the clutching means operates in a dry chamber to permit of the use of dry type friction clutch means extremely desirable for heavy power transmission.

In addition, the invention has other marked improvements and superiorities which radically distinguish it from presently known structures. These improvements or superior characteristics embodying certain novel features of construction are clearly set forth in the appended claims; and a preferred embodiment of the invention is hereinafter shown with reference to the accompanying drawings forming part of the specification.

Figure 1:
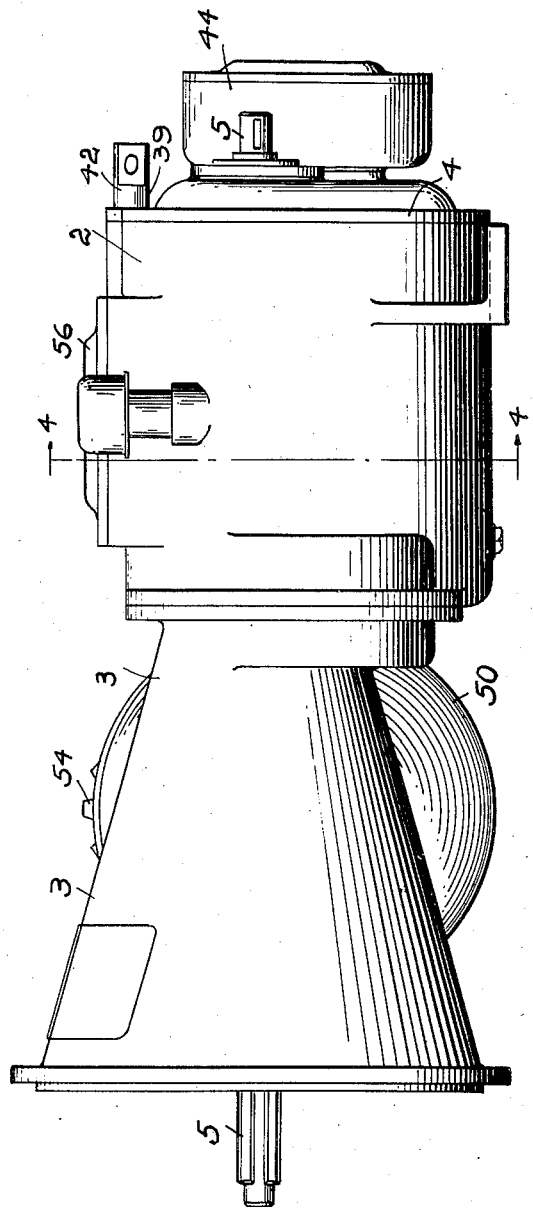
Fig. 1 is a side-view of the transmission of a mixer embodying the invention.
Figure 2:
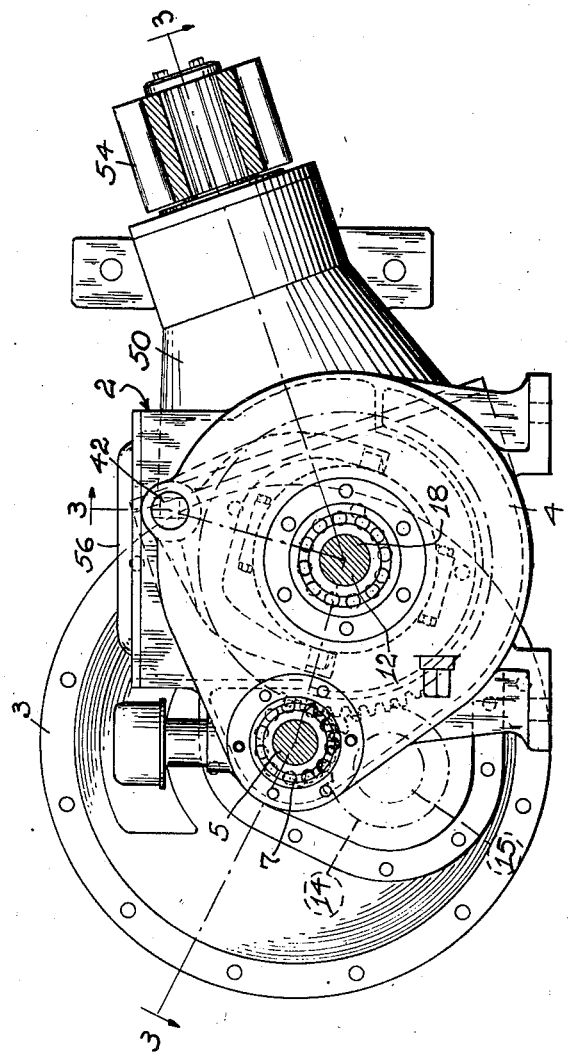
Fig. 2 is a front view, partly in section, of the transmission shown in Fig. 1.
Figure 3:
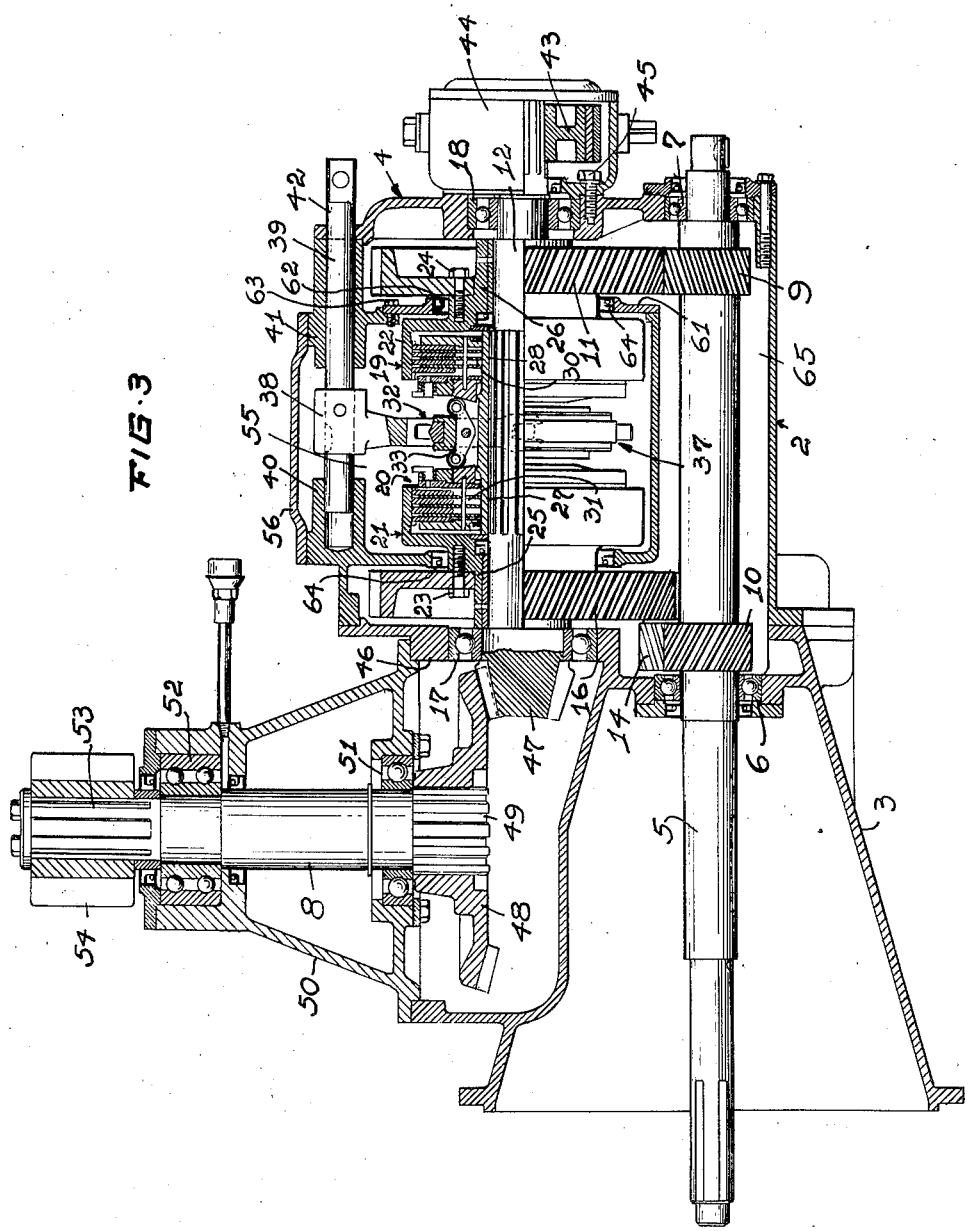
Fig. 3 is a longitudinal sectional view through the transmission shown in Figs. 1 and 2, the section being taken on line 3—3 of Fig. 2.
Figure 4:
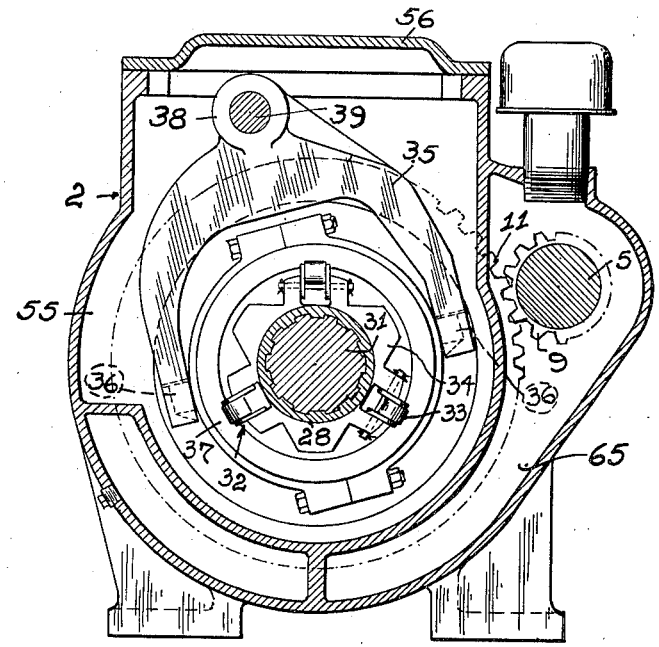
Fig. 4 is a cross-sectional view on line 4—4 of Fig. 1.

Referring now in detail to the exemplified form of the invention shown in the drawings, reference numeral 2 denotes a main housing which at its rear end mounts a bell housing 3 and, at its front end, is closed by a cover member 4 preferably of a shape as indicated. Housing 2 has extended therethrough an input shaft 5 mounted in ball bearings 6 and 7 in bell housing 3 and cover member 4 respectively, which shaft transfers through the gearing of the transmission power to an output shaft 8, as will be described hereinafter. Thus, input shaft 5 embodies two spaced helical pinions 9 and 10, pinion 9 of which is in mesh with a large helical gear 11 on a shaft 12, and pinion 10 of which is coupled by means of idler gear 14 on a countershaft 15 with another large helical gear 16 also mounted on shaft 12. This latter shaft which is arranged parallel to input shaft 5 and mounted in ball bearings 17 and 18, mounts the gears 11 and 16 freely rotatably in spaced relation with respect to each other and carries two friction clutches 19 and 20 mounted on said shaft between helical gears 11 and 16. Clutches 19 and 20 are of the multiplate friction type, have their flanged, outer clutch members 21 and 22 rigidly secured to the helical gears 11 and 16 respectively by means of bolts 23, 24 securing hub portions 25, 26 of these clutch members to the respective gears, and have the collars 27, 28 of their inner clutch members 30, 31 slidably mounted on the splined portion 31 of shaft 12 to permit of clutching operations of clutches 19 and 20 by a shiftable clutch actuating mechanism 32. This mechanism which, when shifted in opposite directions, operates either one of clutches 19 or 20, embodies a plurality of clutch finger assemblies 33 which are pivotally supported on a clutch hub 34 and co-operate with the inner clutch members 30, 31 when clutch hub 34 is actuated. Such an actuation is effected by a fork-shaped shifting member 35 which engages the studs 36 of a collar member 37 rotatably mounted on clutch hub 34. Member 35 includes a bearing portion 38 sleeved upon and secured to a shifting rod 39 which is slidably mounted in bearings 40 and 41 of housing 2 and outwardly extended at 42 to permit of operating the clutch actuating mechanism and effect rotation of shaft 12 in forward or reverse direction as the case may be.

During operation of the transmission, the shaft 12 when coupled with the continuously rotating helical gear 11 by actuation of clutch 19 is rotated in one direction and when coupled with the continuously rotating helical gear 16 by actuation of clutch 20 is rotated in an opposite direction. When the two clutches 19 and 20 are in neutral or inoperative position shaft 12 is at a stand-still and the gears 11 and 16 and clutch members 21 and 22 coupled therewith are rotating.

Shaft 12 is extended outwardly through cover member 4 and has its outer end coupled with the brake mechanism 43 of brake 44 so as to exert a braking action on said shaft when the drive between input shaft 5 and shaft 12 is interrupted. This brake which preferably is of the usual external type, is mounted on cover member 4 by means of screws 45. The opposite end of shaft 12 extends through the wall 46 of bell housing 3 and is provided with an integral bevel pinion 47 in mesh with a bevel gear 48 mounted on the splined end 49 of output shaft 8. This output shaft which is rotatably mounted in an extension 50 of bell housing 3, ball bearings 51 and 52 being used for such purpose, is extended with its other end 53 through said extension and carries at this end a pinion 54 adapted to effect driving engagement with the bull gear or other driving connection of a mixer (not shown).

Figure 5:
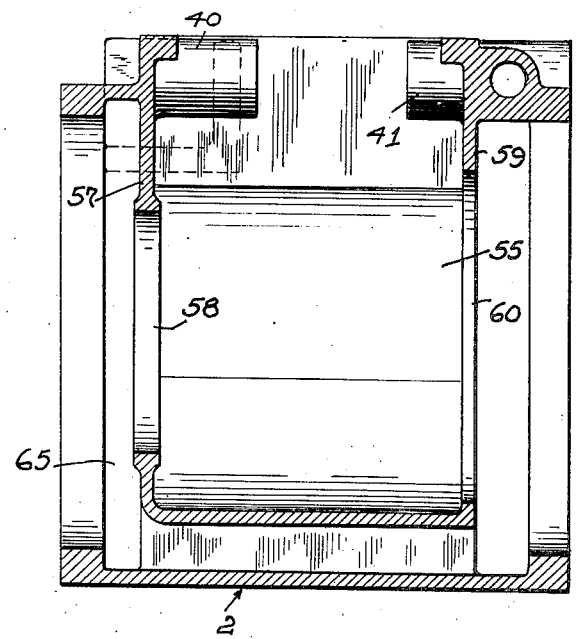
Fig. 5 is a longitudinal sectional view through the main housing of the transmission showing the U-shaped communicating gearing chamber and the individual clutch chamber arranged above the central portion of said gearing chamber.

The described transmission which has its clutching means arranged between independent axially aligned gearings, one for forward and one for reverse rotation of the output shaft, permits mounting of gearing and clutching means in individual non-communicating chambers, so that the gearing can be lubricated individually and the clutching means run dry as customary for friction type clutches etc. To accomplish this purpose, the housing 2, see Fig. 5, is formed with a central chamber 55 which is closed at its top by a cover 56. This chamber has arranged in its one side wall 57 a circular opening 58 for the hub portion 25 of outer clutch member 21 and has its other side wall 59 provided with a large opening 60 which is closed by a cover member 61. This latter cover member includes a circular opening 62 for hub portion 26 of outer clutch member 22 and is secured to wall 59 by screws 63. Two rawhide sealing members 64 fluid-tightly seal central chamber 55 from a U-shaped chamber 65 which partly encircles chamber 55 and mounts in its symmetrically arranged sides helical gears 11 and 16 engaged with and driven by helical pinions 9 and 10.

Having thus described my invention, what I claim is:

1. In a transmission a driven shaft, individual gearings for forward and reverse rotation of said shaft arranged in spaced relation with respect to each other, friction plate clutch means on said shaft arranged between said gearings for selectively coupling said shaft with either one of said gearings, and a chambered housing embodying a single, U-shaped chamber for said two gearings and a chamber for said clutch means encircled by said U-shaped chamber, said two chambers being fluid-tightly sealed from each other and having said shaft extended through the walls of said chambers outside of said housing.

2. In a transmission a driven shaft, individual gearings for forward and reverse rotation of said shaft arranged in spaced relation with respect to each other, friction plate clutch means on said shaft arranged between said gearings for selectively coupling said shaft with either one of said gearings, and a housing embodying a chambered body having integrally extended from its inner surface symmetrically arranged walls subdividing said housing into a central chamber enclosing said clutch means and a chamber of U-shaped cross section enclosing said gearings and partly encircling said central chamber, said driven shaft being extended through the symmetrically arranged walls of said chambered body and said chambers being fluid-tightly sealed from each other.

3. In a transmission an input shaft, a driven shaft, gearing coupled with said input shaft adapted to rotate said driven shaft in one direction and including a gear freely rotatably mounted on said driven shaft, another gearing coupled with said input shaft adapted to rotate said driven shaft in the opposite direction and including another gear freely rotatably mounted on said driven shaft in spaced relation with respect to said first gear, friction plate clutch means slidably and non-rotatably mounted on said driven shaft adapted to couple same with either one of said gears, actuating means for said clutch means slidably arranged above said driven shaft for parallel movement with respect thereto, and a housing for all of said elements, said housing embodying an elongated chambered main body closed at its open opposite ends by cover mean and including symmetrically arranged wall portions extended from the wall of said body for subdividing said housing into a chamber of U-shaped cross section enclosing said two gearings and a central chamber encircled by said U-shaped chamber and enclosing said friction plate clutch means, said central chamber including an outwardly extended portion slidably mounting said clutch actuating means, and said input shaft and the driven shaft extend through said elongated main body and being rotatably mounted in and extended through the cover means of said elongated main body.

4. A transmission as described in claim 3, wherein the symmetrically arranged wall portions of said main body extend inwardly and outwardly thereof and wherein the outwardly extended portions of said wall portions slidably mount a shaft having said clutch actuating means secured thereto.

5. A transmission as described in claim 3, wherein one of said symmetrically arranged wall portions includes a cover closed circular opening of sufficient size to permit of free removal of the fully assembled friction plate clutch means from said central chamber.

CHRIS GERST.